(12) United States Patent
Ma et al.

(10) Patent No.: US 12,085,192 B2
(45) Date of Patent: Sep. 10, 2024

(54) STRAIGHT-STROKE NO-MATERIAL-LOSS HIGH-TEMPERATURE NORMAL-PRESSURE FILLER SEALING STRUCTURE

(71) Applicant: WUZHONG INSTRUMENT CO., LTD., Ningxia (CN)

(72) Inventors: Yushan Ma, Wuzhong (CN); Haixia Su, Wuzhong (CN); Zhandong Chang, Wuzhong (CN); Zhiyun Feng, Wuzhong (CN); Runhai Hou, Wuzhong (CN)

(73) Assignee: WUZHONG INSTRUMENT CO., LTD., Wuzhong (CN)

( * ) Notice: Subject to any disclaimer, the term of this patent is extended or adjusted under 35 U.S.C. 154(b) by 27 days.

(21) Appl. No.: 18/304,317

(22) Filed: Apr. 20, 2023

(65) Prior Publication Data
US 2023/0250893 A1    Aug. 10, 2023

Related U.S. Application Data

(63) Continuation-in-part of application No. PCT/CN2021/115022, filed on Aug. 27, 2021.

(30) Foreign Application Priority Data

Oct. 20, 2020    (CN) .......................... 202011127753.0

(51) Int. Cl.
*F16K 41/04*    (2006.01)
*F16J 15/00*    (2006.01)
(Continued)

(52) U.S. Cl.
CPC ............. *F16K 41/04* (2013.01); *F16J 15/002* (2013.01); *F16J 15/18* (2013.01); *F16K 37/0083* (2013.01)

(58) Field of Classification Search
CPC ...... F16K 41/04; F16K 37/0083; F16K 41/02; F16J 15/002; F16J 15/18; F16J 9/12
See application file for complete search history.

(56) References Cited

U.S. PATENT DOCUMENTS 4,328,974 A * 5/1982 White ...................... F16J 15/20
                                                                277/540
4,706,970 A * 11/1987 Ramirez .............. F16J 15/3212
                                                                277/556
(Continued)

FOREIGN PATENT DOCUMENTS

| CN | 202708304 U | 1/2013 |
| CN | 203115279 U | 8/2013 |

(Continued)

OTHER PUBLICATIONS

Han, Zhengdong et al., Sealing Principle, Leakage Problem and Treatment of Valve in Petrochemical Plant, Advanced Power and Energy Technology, 2021, 6 pages.
(Continued)

*Primary Examiner* — Jessica Cahill
(74) *Attorney, Agent, or Firm* — METIS IP LLC (57) ABSTRACT

The present disclosure provides a straight-stroke no-material-loss high-temperature normal-pressure filler sealing structure, comprising: an upper valve cover with an accommodation cavity; a valve stem, passing through the accommodation cavity of the upper valve cover; a filler component, located in the accommodation cavity and sleeved on the valve stem; a filler gland sleeved on the valve stem, whose bottom is inserted into an opening of the accommodation cavity.

5 Claims, 5 Drawing Sheets

(51) Int. Cl.
  *F16J 15/18*  (2006.01)
  *F16K 37/00*  (2006.01)

(56) References Cited

U.S. PATENT DOCUMENTS

| | | | | |
|---|---|---|---|---|
| 4,886,241 | A * | 12/1989 | Davis | F16J 15/183 |
| | | | | 277/584 |
| 5,056,757 | A * | 10/1991 | Wood | F16J 15/20 |
| | | | | 277/516 |
| 5,375,812 | A * | 12/1994 | Kent | F16K 41/04 |
| | | | | 277/550 |
| 6,182,974 | B1 * | 2/2001 | Harrelson, III | F16J 15/26 |
| | | | | 277/548 |
| 2012/0211945 | A1 * | 8/2012 | Lindner-Silwester | |
| | | | | F04B 39/041 |
| | | | | 277/508 |
| 2015/0102247 | A1 * | 4/2015 | Leboeuf | F16K 41/04 |
| | | | | 251/214 |

FOREIGN PATENT DOCUMENTS

| | | |
|---|---|---|
| CN | 205207888 U | 5/2016 |
| CN | 206299890 U | 7/2017 |
| CN | 206338433 U | 7/2017 |
| CN | 208221748 U | 12/2018 |
| CN | 209245441 U | 8/2019 |
| CN | 112283440 A | 1/2021 |
| EP | 1925859 A1 | 5/2008 |
| JP | 2017215007 A | 12/2017 |

OTHER PUBLICATIONS

"Ma Zhigang Miaoknowing Sealing", Web page <https://www.youtube.com/watch?v=mm-olOrWOsw>, Dec. 8, 2021.
International Search Report in PCT/CN2021/115022 mailed on Oct. 27, 2021, 7 pages.
Written Opinion in PCT/CN2021/115022 mailed on Oct. 27, 2021, 12 pages.
Notification to Grant Patent Right for Invention in Chinese Application No. 202011127753.0 mailed on Jan. 26, 2022, 8 pages.

* cited by examiner

STRAIGHT-STROKE NO-MATERIAL-LOSS HIGH-TEMPERATURE NORMAL-PRESSURE FILLER SEALING STRUCTURE

CROSS-REFERENCE TO RELATED APPLICATIONS

This application is a continuation-in-part application of International Application No. PCT/CN2021/115022, filed on Aug. 27, 2021, which claims priority of Chinese Patent Application No. 202011127753.0, filed on Oct. 20, 2020, the contents of which are hereby incorporated by reference to their entireties.

TECHNICAL FIELD

The present disclosure relates to the field of high-temperature normal-pressure straight-stroke control valve, and in particular, to a straight-stroke no-material-loss high-temperature normal-pressure filler sealing structure.

BACKGROUND

A sealing filler of a valve under a high temperature and a normal pressure condition is usually filler components composed of graphite and graphite packing, but this filler sealing structure has some shortcomings in actual application. The valve stem attaches some graphite material on its surface during operation, which causes crawling of the valve stem and insufficient sealing force of the sealing filler component due to a mass loss, resulting in media leakage.

Therefore, it is desired to provide a straight-stroke no-material-loss high-temperature normal-pressure filler sealing structure, which can avoid the mass loss of the filler component.

SUMMARY

An aspect of the present disclosure provides a straight-stroke no-material-loss high-temperature normal-pressure filler sealing structure, comprising: an upper valve cover with an accommodation cavity; a valve stem, passing through the accommodation cavity of the upper valve cover; a filler component, located in the accommodation cavity and sleeved on the valve stem; a filler gland sleeved on the valve stem, whose bottom is inserted into an opening of the accommodation cavity.

In some embodiments, the filler component includes a first scraper ring, a first primary-secondary filler, a support ring, a second primary-secondary filler, and a second scraper ring which are sleeved on the valve stem in succession, and the first scraper ring and the second scraper ring are arranged symmetrically.

In some embodiments, the first scraper ring includes metal scrapers in an up-down arrangement, and a graphite sealing ring is located between the metal scrapers. A bottom of an inner ring of the metal scraper located below is provided with an arc angle, and an annular storage groove is arranged upward at the bottom of the inner ring of the metal scraper.

In some embodiments, the first primary-secondary filler and the second primary-secondary filler are arranged symmetrically; the first primary-secondary filler includes an upper filler having an inverted right triangle cross-section, and a lower filler having an upright right triangle cross-section; the lower filler is sleeved inside the upper filler, and the upper filler and the lower filler are connected by a wedge-shaped metal ring.

In some embodiments, a filler bottom gasket and a heat insulation ring are also arranged below the filler component in succession.

In some embodiments, a top of the upper valve cover is fixed with a pressure plate by a bolt and a nut, and the pressure plate is pressed against an upper end surface of the filler gland; and a pretension disc is sleeved on the bolt and located between the pressure plate and the nut.

In some embodiments, an inner ring of the filler gland is provided with an upper guide ring against the valve stem; and a lower guide sleeve against the valve stem is provided inside the upper valve cover.

In some embodiments, a material of the upper guide ring and the lower guide sleeve includes at least graphite.

In some embodiments, the structure further includes a drive load detection unit. The drive load detection unit is used to obtain a drive load when the valve stem is driven. The drive load detection unit includes a microprocessor and an early warning unit. The microprocessor is used to control the early warning unit to issue an early warning in response to an actual drive load at a current moment not meeting a preset condition. The preset condition is related to a filler parameter, a valve stem parameter, a sealed medium parameter, and a drive load corresponding to a target filler parameter, the filler parameter including at least a filler physical parameter and a filler geometry parameter.

In some embodiments, the preset condition includes that a difference between the actual drive load at the current moment and a standard drive load at the current moment is less than a preset threshold, and the standard drive load at the current moment is determined by the microprocessor based on a decay feature of the drive load.

In some embodiments, the microprocessor is further used to control the early warning unit to issue the early warning in response to the actual drive load not meeting the preset condition for at least a preset number of consecutive moments. The preset number is determined based on at least the filler geometry parameter.

Another aspect of the present disclosure provides a method for installing a straight-stroke no-material-loss high-temperature normal-pressure filler sealing structure, comprising: determining a target filler parameter and symmetrically setting the first primary-secondary filler and the second primary-secondary filler based on the target filler parameter.

In some embodiments, the method includes: generating at least one group of candidate filler parameters; for each group of the at least one group of candidate filler parameters, determining a predicted leakage rate by a leakage rate evaluation model, the leakage rate evaluation model being a machine learning model; and determining the target filler parameter based on the predicted leakage rate for each group of the at least one group of the candidate filler parameters.

In some embodiments, the leakage rate evaluation model includes a first embedding layer and a first prediction layer; the first embedding layer is used to process the candidate filler parameter, a value stem parameter, and a sealed medium parameter to determine a first embedding vector; and the first prediction layer is used to process the first embedding vector to determine the predicted leakage rate.

In some embodiments, the method further includes: determining a candidate filler parameter with the predicted leakage rate less than a leakage rate threshold as an optional filler parameter; for at least one group of the optional filler parameters, determining a mechanical evaluation value of each group of at least one group of optional filler parameters by a mechanical evaluation value determination model; and determining the target filler parameter based on the mechanical evaluation value of each group of at least one group of optional filler parameters.

In some embodiments, the mechanical evaluation value determination model includes a second embedding layer and a second prediction layer; the second embedding layer is used to process the optional filler parameter, a value stem parameter, and a sealed medium parameter to determine a second embedding vector; and the second prediction layer is used to process the second embedding vector to determine the mechanical evaluation value.

In some embodiments, the mechanical evaluation value also includes a decay feature of the drive load.

Some embodiments of the present disclosure bring at least beneficial effects as follows.

(1) The upper valve cover, the valve stem, the filler component, and the filler gland work together to effectively solve the phenomenon of valve stem crawling, high-temperature clamping, offset and media leakage at the filler during the operation of the straight-stroke regulating valve stem in the high-temperature and normal pressure conditions.

(2) The use of the first and second scraper ring can effectively block the mass loss of graphite sealing filler. A support ring is designed between the first and second primary-secondary fillers to solve the problem of insufficient compression force of the second primary-secondary filler at the bottom, so that the first and second primary-secondary fillers have a lasting and stable sealing force. By setting the first scraper ring, the first primary-secondary filler, the support ring, the second primary-secondary filler and the second scraper ring which are sleeved on the valve stem in succession, it can provide radial sealing force to prevent the filler leakage and better maintain the sealing effect of the whole filler component.

(3) Through the joint action of the metal scrapers, the graphite sealing ring, the arc angle and the annular storage groove, the sealing effect of the filler can be effectively improved and the filler leakage problem can be solved. The metal scrapers and the graphite sealing ring adopt the soft and hard combination structure, and the metal scrapers adopt the arc angle scraper design to avoid scratching the valve stem, and the annular storage groove is designed to avoid the uneven storage of material on the valve stem to produce too much local friction and other unfavorable factors, which can effectively solve the filler leakage problem of the filler sealing caused by the graphite material loss.

(4) The first and the second primary-secondary fillers are assembled in a forward and backward manner from top to bottom, and a wedge-shaped metal ring is designed at the joint of the primary-secondary fillers, which solves the problem of insufficient radial sealing force of the fillers due to plastic deformation at the inner and outer joint of the upper and lower fillers, and the combination of soft and hard assembly makes the upper and lower fillers maintain the required radial sealing force under a given compression force. The upper and lower fillers form a good radial sealing force under the action of compression force, which can effectively stop the medium leakage. The upper and lower fillers can be further strengthened through the wedge-shaped metal ring connection, which can improve the stability of the filler sealing.

(5) By setting the filler bottom gasket and the heat insulation ring, the friction between the filler component and the valve stem can be effectively reduced, the wear degree of the valve stem can be reduced, the temperature at the filler component can be reduced, thus reducing the deformation of the valve stem at high temperature, reducing problems such as clamping and crawling of the valve stem at the filler, and improving the sealing performance and service life.

(6) By determining the target filler parameter, it can make the straight-stroke no-material-loss high-temperature normal-pressure filler sealing structure maintain good sealing performance, avoid the problem of the medium leakage at the filler caused by insufficient filler sealing force, and reduce the driving force required by the valve stem, thus extending its service life.

BRIEF DESCRIPTION OF THE DRAWINGS

The present disclosure is further illustrated in terms of exemplary embodiments. These exemplary embodiments are described in detail with reference to the drawings. These embodiments are not limited. In these embodiments, the same number represents the same structure, wherein.

DETAILED DESCRIPTION

To more clearly describe the technical schemes of embodiments of the present disclosure, the accompanying drawings needed to be configured in the description of the embodiments will be briefly described below. Obviously, the drawings in the following description are merely some examples or embodiments of the present disclosure, and will be applied to other similar scenarios according to these accompanying drawings without paying creative labor. Unless obviously obtained from the context or the context illustrates otherwise, the same numeral in the drawings refers to the same structure or operation.

It should be understood that the "system", "device", "unit" and/or "module" used herein is a method for distinguishing different components, elements, components, parts or assemblies of different levels. However, if other words may achieve the same purpose, the words may be replaced by other expressions.

As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in present disclosure, specify the presence of stated features, integers, steps, operations, elements, and/or components, but do not preclude the presence or addition of one or more other features, integers, steps, operations, elements, components, and/or groups thereof.

In some embodiments, the straight-stroke no-material-loss high-temperature normal-pressure filler sealing structure may include: an upper valve cover with an accommodation cavity; a valve stem, passing through the accommodation cavity of the upper valve cover; a filler component, located in the accommodation cavity and sleeved on the valve stem; and a filler gland sleeved on the valve stem, whose bottom is inserted into an opening of the accommodation cavity.

The upper valve cover is a component used to accommodate and protect a filler component and connect to the valve stem. The upper valve cover may be in a variety of forms. For example, the upper valve cover may be made of cast iron, stainless steel, and other materials; and a shape of the upper valve cover may be trapezoidal-like. The material and shape of the upper valve cover are not limited herein. There is an accommodation cavity inside the upper valve cover. A size of the accommodation cavity may be set according to actual requirements.

The valve stem is a transmission component responsible for transmitting an operating force to the inside of the valve to open and close the valve. The valve stem may be in various forms. For example, the valve stem may usually be made of wear-resistant and corrosion-resistant metal materials, such as stainless steel, carbon steel, etc. A shape of the valve stem may be cylindrical. The material and shape of the valve stem is not limited here. In some embodiments, the valve stem may pass through the accommodation cavity arranged in the upper valve cover. With this setup, the upper valve cover may provide support for the valve stem and protect the filler component.

The filler component is a component that holds a filler. The filler may be graphite, graphite packing, etc. The filler may also be other materials, for example, a hard filler such as an opening ring and a split ring, which is not limited herein. In some embodiments, the filler component may be sleeved on the valve stem. By placing the filler between the valve stem and the filler component, a seal may be formed around the valve stem to prevent a medium leakage at the filler.

The filler gland is a component that applies pressure to the filler. The filler gland may be in various forms. For example, the filler gland may be made of metal materials, such as cast iron, stainless steel, etc. A shape of the filler gland may be a ring cylinder. The material and shape of the filler gland rod are not limited here. By applying pressure on the filler by the filler gland, the filler may be covered in the accommodation cavity to achieve a sealing effect.

Figure 1:
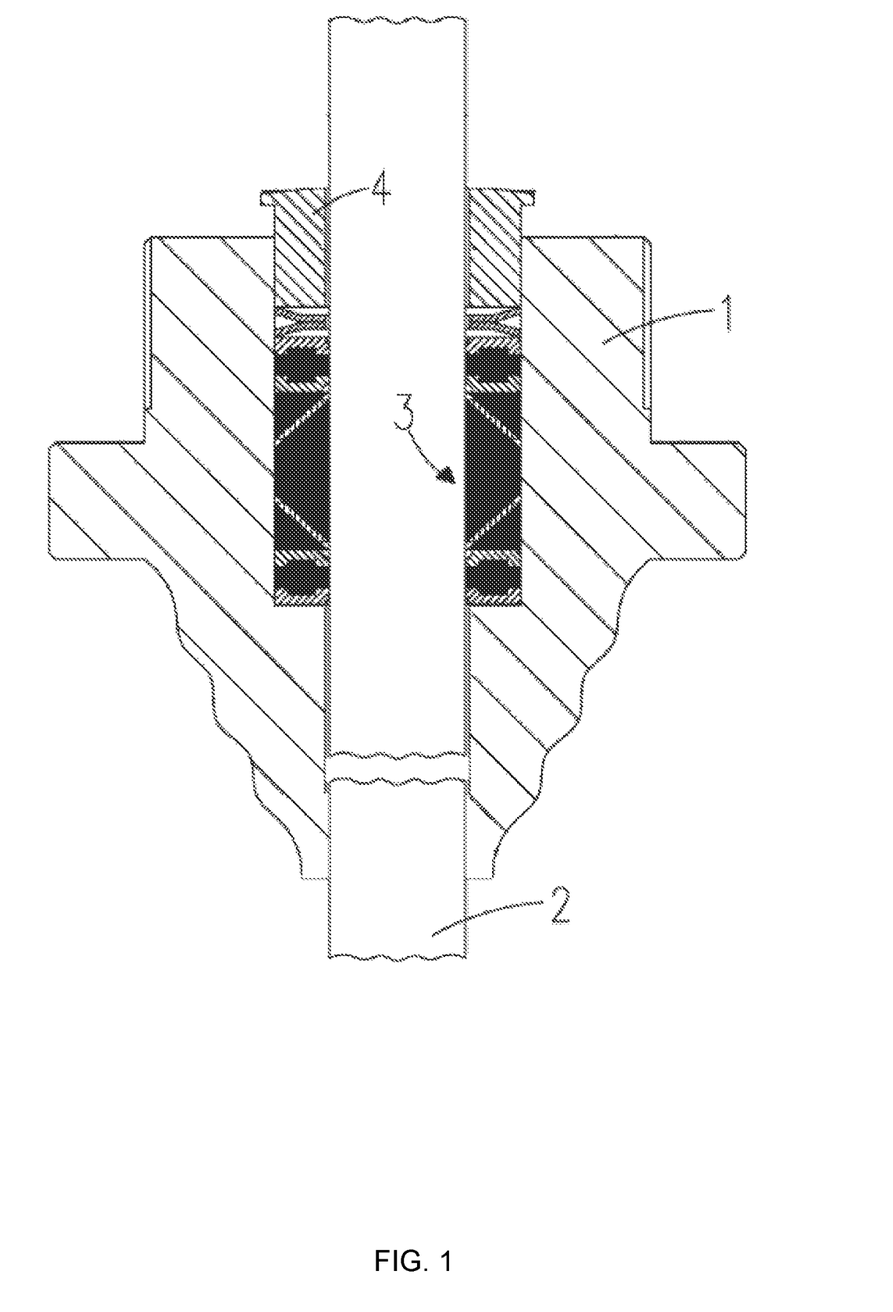
FIG. 1 is a schematic diagram illustrating an exemplary structure of a straight-stroke no-material-loss high-temperature normal-pressure filler sealing structure according to some embodiments of the present disclosure.

FIG. 1 is a schematic diagram illustrating an exemplary structure of a straight-stroke no-material-loss high-temperature normal-pressure filler sealing structure according to some embodiments of the present disclosure.

As shown in FIG. 1, 1 is the upper valve cover, 2 is the valve stem, 3 is the filler component, and 4 is the filler gland.

In some embodiments, the upper valve cover 1 has an accommodation cavity for accommodating the filler component. The valve stem 2 passes through the accommodation cavity of the upper valve cover 1. The filler component 3 is located in the accommodation cavity of the upper valve cover 1 and is sleeved on the valve stem 2. The filler gland 4 is sleeved on the valve stem 2, and a bottom of the filler gland 4 is inserted into an opening in the accommodation cavity. By applying a pressure to the filler gland 4, the filler in the filler component 3 may be tightly fitted on the valve stem 2, thus achieving a sealing effect.

In some embodiments of the present disclosure, the upper valve cover, the valve stem, the filler component and the filler gland work together to effectively solve the phenomenon of valve stem crawling, high-temperature clamping, offset and media leakage at the filler during the operation of the straight-stroke regulating valve stem in the high-temperature and normal pressure conditions.

In some embodiments, the filler component may include a first scraper ring, a first primary-secondary filler, a support ring, a second primary-secondary filler, and a second scraper ring that are sleeved on the valve stem in succession; and the first scraper ring and the second scraper ring are arranged symmetrically.

The first scraper ring and the second scraper ring may be used to scrape the filler. In some embodiments, the first scraper ring and the second scraper ring may be metal scrapers. The first scraper ring and the second scraper ring may also be other materials and are not limited herein.

In some embodiments, the first scraper ring and the second scraper ring arranged symmetrically may include that arrangement positions of the first scraper ring and the second scraper ring are symmetrically. For example, the first scraper ring and the second scraper ring may be arranged symmetrically on both sides of the support ring. For more information, please refer to FIG. 3 and its related descriptions.

The first primary-secondary filler and the second primary-secondary filler are two types of fillers placed in different positions. The first primary-secondary filler and the second primary-secondary filler may be arranged on upper and lower sides of the support ring and sleeved on the valve stem. For more information, please refer to FIG. 4 and its related descriptions.

The support ring is a support structure located between the first primary-secondary filler and the second primary-secondary filler. The support ring is arranged around the valve stem and may be an annular structure. By designing the support ring, it can solve the problem of insufficient compression force of the second primary-secondary filler at the bottom, and make the first and second primary-secondary fillers have a lasting and stable sealing force.

Figure 2:
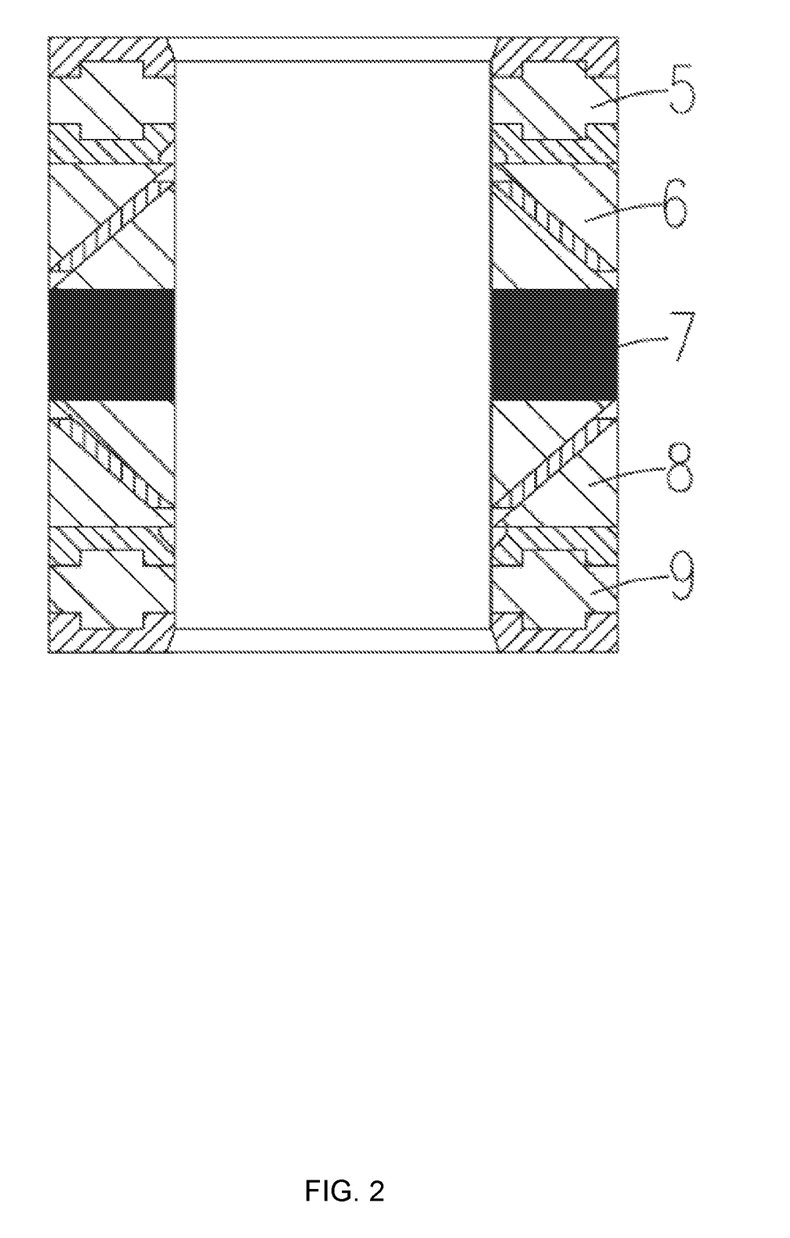
FIG. 2 is a schematic diagram illustrating an exemplary structure of a filler component according to some embodiments of the present disclosure.

FIG. 2 is a schematic diagram illustrating an exemplary structure of a filler component according to some embodiments of the present disclosure.

As shown in FIG. 2, 5 is the first scraper ring, 6 is the first primary-secondary filler, 7 is the support ring, 8 is the second primary-secondary filler, and 9 is the second scraper ring.

In some embodiments, the first scraper ring 5, the first primary-secondary filler 6, the support ring 7, the second primary-secondary filler 8 and the second scraper ring 9 are sleeved on the valve stem in succession. The first scraper ring 5 and the second scraper ring 9 are arranged on both sides of the support ring 7.

In some embodiments of the present disclosure, the use of the first and second scraper rings may effectively block a mass loss of graphite sealing filler. A support ring is designed between the first and second primary-secondary fillers to solve the problem of insufficient compression force of the second primary-secondary filler at the bottom, which makes the first and second primary-secondary fillers have a lasting and stable sealing force. By setting the first scraper ring, the first primary-secondary filler, the support ring, the second primary-secondary filler and the second scraper ring which are sleeved on the valve stem 2 in succession, it can provide radial sealing force to prevent the filler from leaking and better maintain the sealing effect of the whole filler component.

In some embodiments, the first scraper ring includes metal scrapers in an up-down arrangement, and a graphite sealing ring located between the metal scrapers; a bottom of an inner ring of the metal scraper located below is provided with an arc angle, and an annular storage groove is arranged upward at the bottom of the inner ring of metal scraper. The below refers to a side away from the filler gland.

In some embodiments, the metal scrapers are arranged on the upper and lower sides of the first scraper ring along a driving direction of the valve stem. In some embodiments, the graphite sealing ring is located within the first scraper ring and between the above and below metal scrapers. The metal scrapers may form a combined hard and soft structure together with the graphite sealing ring to improve the sealing effect.

The arc angle is a structure obtained by processing a fillet. The arc angle design reduces the friction between the metal scrapers below the first scraper ring and the valve stem, reducing friction loss and avoiding scratching the surface of the valve stem. At the same time, it helps to improve the sealing performance between the metal scrapers and the valve stem.

The annular storage groove refers to an annular groove structure. In some embodiments, the annular storage groove may be used to collect the filler scraped by the scrapers to prevent uneven distribution of the filler on the valve stem. By designing the annular storage groove, it helps to reduce the unfavorable factors such as excessive local friction on the valve stem, and effectively solve the filler leakage problem of the filler sealing caused by the graphite material loss.

In some embodiments, the second scraper ring may also include metal scrapers in an up-down arrangement, and a graphite sealing ring located between the metal scrapers; a bottom of an inner ring of the metal scraper located above may be provided with an arc angle, and an annular storage groove may be arranged upward at a top of the inner ring of the metal scraper. The above refers to a side near the filler gland.

In some embodiments, the first scraper ring and the second scraper ring arranged symmetrically may include that the structures of the first scraper ring and the second scraper ring are arranged symmetrically. For example, the bottom of the inner ring of the metal scraper located below in the first scraper ring is provided with the arc angle, the annular storage groove is arranged upwards on the bottom of the inner ring of the metal scraper; and the bottom of the inner ring of the metal scraper located above in the second scraper ring is provided with the arc angle, and the annular storage groove is arranged downwards the bottom of the inner ring of the metal scraper is opened.

Figure 3:
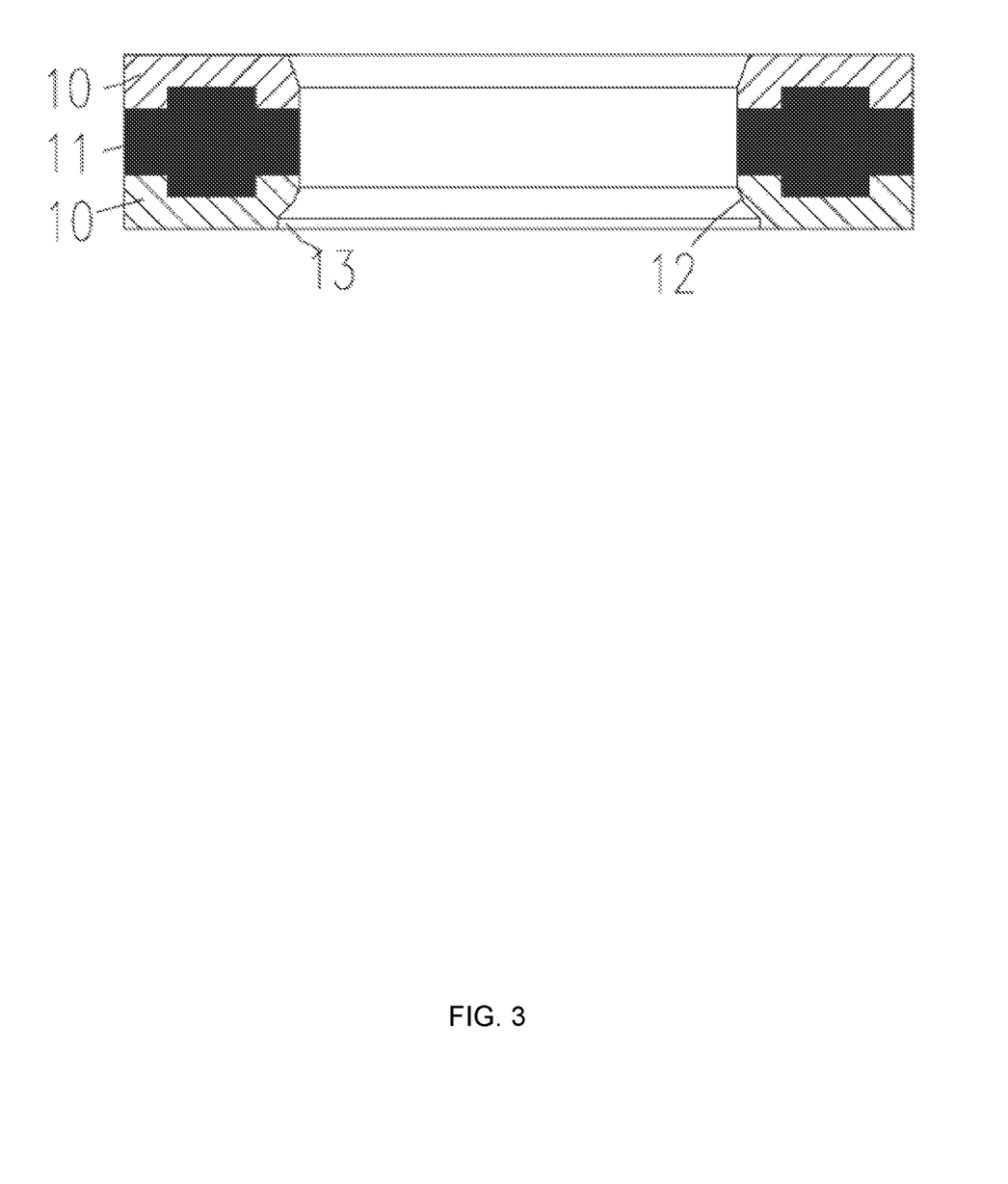
FIG. 3 is a schematic diagram illustrating an exemplary structure of a first scraper ring according to some embodiments of the present disclosure.

FIG. 3 is a schematic diagram illustrating an exemplary structure of a first scraper ring according to some embodiments of the present disclosure.

As shown in FIG. 3, 10 is the metal scrapers, 11 is the graphite sealing ring, 12 is the arc angle, and 13 is the annular storage groove.

In some embodiments, the metal scrapers 10 may be arranged above and below the first scraper ring 5, and the graphite sealing ring 11 may be arranged between the two metal scrapers 10. The bottom of the inner ring of the metal scraper 10 located below in the first scraper ring 5 is provided with the arc angle 12, while the annular storage groove 13 is arranged upwards the bottom of the inner ring of the metal scraper 10 located below in the first scraper ring 5.

In some embodiments of the present disclosure, through the joint action of the metal scrapers, the graphite sealing ring, the arc angle and the annular storage groove, the sealing effect of the filler can be effectively improved and the filler leakage problem can be solved. The metal scrapers and the graphite sealing ring adopt the soft and hard combination structure, and the metal scrapers adopt the arc angle scraper design to avoid scratching the valve stem, and the annular storage groove is designed to avoid the uneven storage of material on the valve stem to produce too much local friction and other unfavorable factors, which can effectively solve the filler leakage problem of the filler sealing caused by the graphite material loss.

In some embodiments, the first primary-secondary filler and the second primary-secondary filler are arranged symmetrically; the first primary-secondary filler includes an upper filler having an inverted right triangle cross-section, and a lower filler having an upright right triangle cross-section. The lower filler is sleeved inside the upper filler, and the upper filler and the lower filler are connected by a wedge-shaped metal ring.

In some embodiments, the filler contained in the first primary-secondary filler may be divided into the upper filler and the lower filler by the wedge-shaped metal ring, and the upper filler and the lower filler are connected by the wedge-shaped metal ring. The upper filler is a portion of the filler located above the wedge-shaped metal ring with the inverted right triangle cross-sectional shape, and the lower filler is a portion of the filler located below the wedge-shaped metal ring with the upright right triangle cross-sectional shape.

In some embodiments, both the upper filler and the lower filler are placed in the filler component, and due to the setting of the wedge-shaped metal ring, the ring structure formed by the upper filler can surround the ring structure formed by the lower filler, i.e., the lower filler may be sleeved inside the upper filler.

The wedge-shaped metal ring may be a ring made of a metal material with a high hardness and wear resistance. For example, the wedge-shaped metal ring may be made of stainless steel. In some embodiments, the wedge-shaped metal ring is sleeved on the valve stem and located between the upper and lower fillers of the first primary-secondary filler, which plays a role of connection and reinforcement to ensure a stable sealing force.

In some embodiments, the wedge-shaped metal ring may be a circular truncated cone with a small upper side and a large lower side, which is set around the valve stem. The upper side is a side near the filler gland and the lower side is a side away from the filler gland. In this setup, the upper filler has an inverted right triangle cross-section, a hypotenuse of which faces the side near the valve stem, and the lower filler has an upright right triangle cross-section, a hypotenuse of which faces the side away from the valve stem and is parallel to the hypotenuse of the aforementioned inverted right triangle.

In some embodiments, the wedge-shaped metal ring may also be a circular truncated cone with a large upper side and a small lower side, which is set around the valve stem. In this setup, the upper filler has an inverted right triangle cross-section, a hypotenuse of which faces a side away from the valve stem, and the lower filler has an upright right triangle cross-section, the hypotenuse of which faces a side near the valve stem and is parallel to the hypotenuse of the aforementioned inverted right triangle. In this setup, the upper filler is sleeved inside the lower filler.

In some embodiments, the second primary-secondary filler may also include an upper filler with an inverted right triangle cross-section and a lower filler with an upright right triangle cross-section, and the upper filler and the lower filler are connected by a wedge-shaped metal ring.

In some embodiments, the first primary-secondary filler and the second primary-secondary filler arranged symmetrically may include that positions of the first primary-secondary filler and the second primary-secondary filler are symmetrically. For example, the first primary-secondary filler and the second primary-secondary filler are arranged symmetrically on both sides of the support ring.

In some embodiments, the first primary-secondary filler and the second primary-secondary filler arranged symmetrically may include that structures of the first primary-secondary filler and the second primary-secondary filler are arranged symmetrically. For example, the wedge-shaped metal ring in the first primary-secondary filler and the wedge-shaped metal ring in the second primary-secondary filler are arranged symmetrically, and when the wedge-shaped metal ring in the first primary-secondary filler is a circular truncated cone structure with a small upper side and a large lower side, the wedge-shaped metal ring in the second primary-secondary filler is a circular truncated cone structure with a large upper side and a small lower side.

Figure 4:
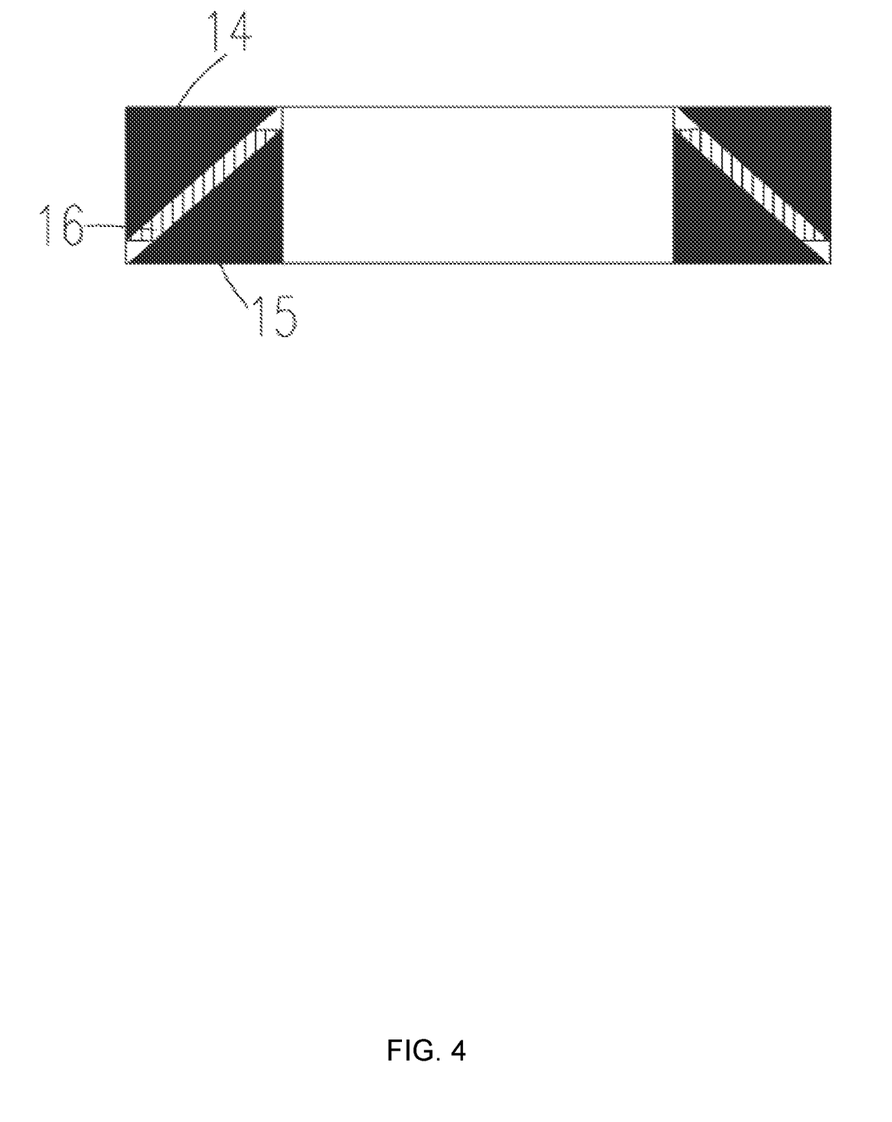
FIG. 4 is a schematic diagram illustrating an exemplary structure of a first primary-secondary filler according to some embodiments of the present disclosure.

FIG. 4 is a schematic diagram illustrating an exemplary structure of a first primary-secondary filler according to some embodiments of the present disclosure.

As shown in FIG. 4, 14 is the upper filler, 15 is the lower filler, and 16 is the wedge-shaped metal ring.

In some embodiments, the lower filler 15 is sleeved inside the upper filler 14, and the upper filler 14 and the lower filler 15 are connected by the wedge-shaped metal ring 16.

In some embodiments, the upper filler 14, the lower filler 15 and the wedge-shaped metal ring 16 form the first primary-secondary filler. The upper filler 14 is located above the wedge-shaped metal ring 16 and has an inverted right triangle cross-section. The lower filler 15 is located below the wedge-shaped metal ring 16 and has an upright right triangle cross-section.

In some embodiments of the present disclosure, the first and the second primary-secondary fillers are assembled in a forward and backward manner from top to bottom, and a wedge-shaped metal ring is designed at the joint of the primary-secondary fillers, which solves the problem of insufficient radial sealing force of the fillers due to plastic deformation at the inner and outer joints of the upper and lower fillers, and the combination of soft and hard assembly makes the upper and lower fillers maintain the required radial sealing force under a given compression force. The upper and lower fillers form a good radial sealing force under the action of compression force, which can effectively stop the medium leakage. The upper and lower fillers is further strengthened through the wedge-shaped metal ring connection, which can improve the stability of the filler sealing.

In some embodiments, a filler bottom gasket and a heat insulation ring are arranged below the filler component in succession.

The filler bottom gasket is an auxiliary component located at a bottom of the filler component and used to support the filler component. In some embodiments, the filler bottom gasket may be made of a variety of materials, such as graphite, polytetrafluoroethylene (PTFE), rubber, or other suitable sealing materials. By arranging the filler bottom gasket, the friction between the filler component and the valve stem can be effectively reduced, reducing the wear of the valve stem and improving the sealing performance and service life.

The heat insulation ring is a component used to reduce heat transfer between the filler component and the valve stem. In some embodiments, the heat insulation ring may be made of a material with high heat resistance and high temperature resistance, such as ceramic, graphite, and other high temperature heat insulation materials. The heat insulation ring may have a variety of structural forms, for example, an annular structure. By arranging the heat insulation ring, the temperature at the filler component is effectively reduced, thereby reducing the deformation of the valve stem at high temperature and reducing problems such as stem clamping and crawling at the filler. In some embodiments, the heat insulation ring can effectively reduce the temperature at the filler by 30° C. to 50° C. by a high temperature test.

In some embodiments, a top of the upper valve cover is fixed with a pressure plate by a bolt and a nut, the pressure plate is pressed against an upper end surface of the filler gland; and a pretension disc is sleeved on the bolt and located between the pressure plate and the nut.

The bolt and nut may be connection components for fixing the pressure plate and the filler gland. In some embodiments, the bolt may pass through the pressure plate and be fastened to the nut so that the pressure plate is tightly against the upper end face of the filler gland.

The pressure plate may be a component used to tightly connect the filler gland and the upper valve cover. In some embodiments, the pressure plate is located on top of the upper valve cover and fixed by the bolt and nut.

The pretension disc may be a component with a pretension effect, which is used to provide a lasting compression force between the bolt and the pressure plate. For example, the pretension disc may be made of an elastic material, such as hard rubber, spring steel, etc., to ensure good pretension at high temperatures. In some embodiments, the pretension disc may be an annular disc of copper metal that can overcome bolt loosening and maintain filler sealing force under high temperature conditions. In some embodiments, the pretension disc is sleeved onto the bolt and located between the pressure plate and the nut.

The pretension structure of the pretension disc effectively overcomes the problem of medium leakage at the filler caused by insufficient filler sealing force due to the loosening of the bolt under high temperature conditions, and this compression form provides a durable bolt compression force for the filler sealing to make the seal reliable and stable. By setting the bolt, nut and pretension disc, it can effectively prevent the medium leakage at the filler.

In some embodiments, an inner ring of the filler gland is provided with an upper guide ring against the valve stem; and a lower guide sleeve against the valve stem is arranged in the upper valve cover.

The upper guide ring and the lower guide sleeve may be components for preventing the valve stem from shifting during operation. In some embodiments, the upper guide ring may be arranged in the inner ring of the filler gland, which is against the valve stem, and the lower guide sleeve is arranged in the upper valve cover and located at the bottom of the lower valve cover, which is against the valve stem. The upper guide ring and the lower guide sleeve form a double guide structure, which can ensure that the valve stem maintain at a correct axial position during operation to overcome the offset of the valve stem during operation, thus solving the problem of clamping and crawling of the valve stem at the filler.

In some embodiments, material of the upper guide ring and the lower guide sleeve includes at least graphite. In some embodiments, the material of the upper guide ring and lower guide sleeve may also include other types, which is not limited herein.

Figure 5:
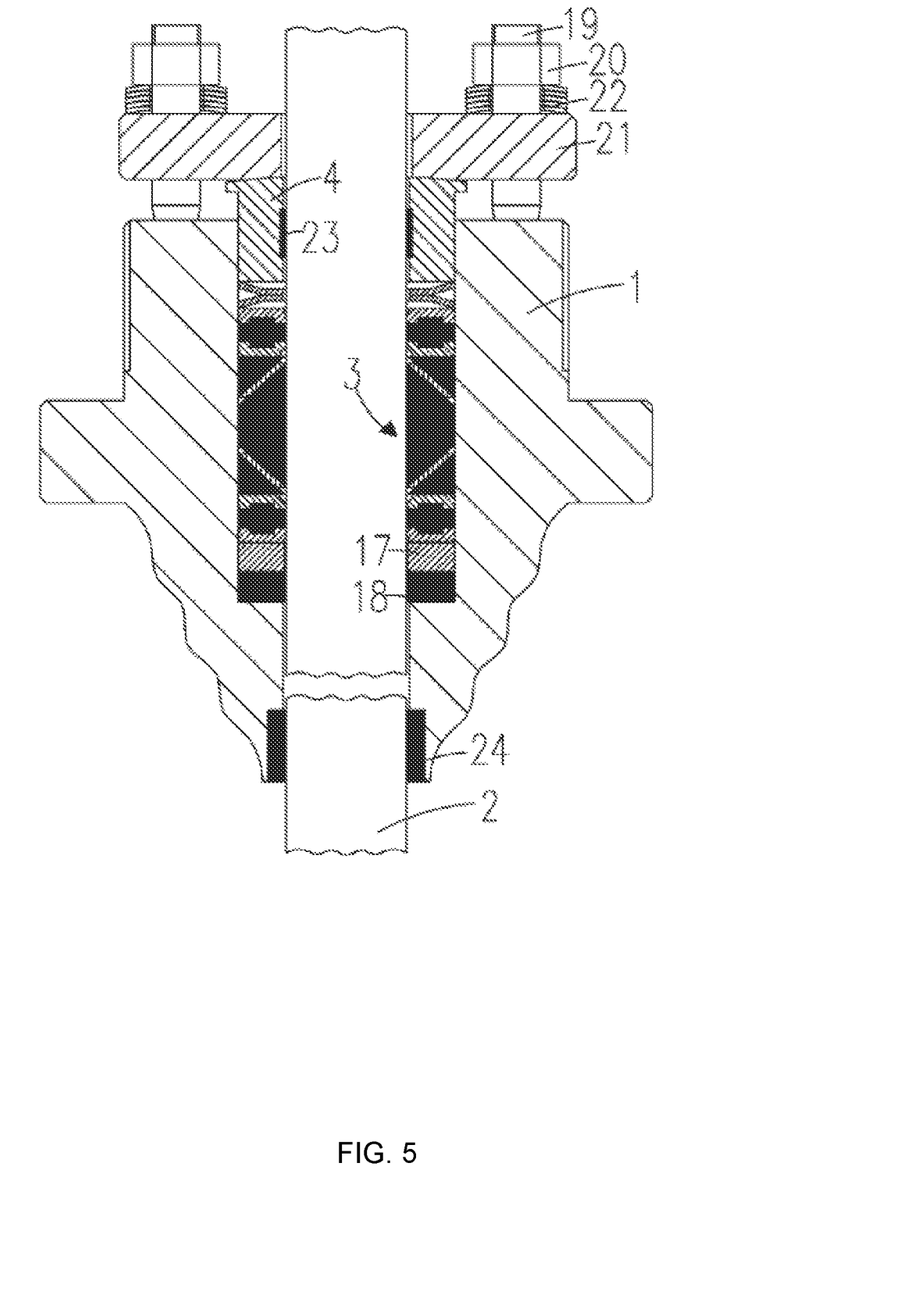
FIG. 5 is a schematic diagram illustrating another exemplary structure of a straight-stroke no-material-loss high-temperature normal-pressure filler sealing structure according to some embodiments of the present disclosure.

FIG. 5 is a schematic diagram illustrating another exemplary structure of a straight-stroke no-material-loss high-temperature normal-pressure filler sealing structure according to some embodiments of the present disclosure.

As shown in FIG. 5, 1 is the upper valve cover, 2 is the valve stem, 3 is the filler component, 4 is the filler gland, 17 is the filler bottom gasket, 18 is the heat insulation ring, 19 is the bolt, 20 is the nut, 21 is the pressure plate, 22 is the pretension disc, 23 is the upper guide ring, and 24 is the lower guide sleeve.

In some embodiments, the filler bottom gasket 17 and heat insulation ring 18 are arranged below the filler component 3 in succession. In some embodiments, the pressure plate 21 may be fixed on the top of the upper valve cover by the bolt 19 and nut 20. The bolt 19 passes through the pressure plate 21, the pretension disc 22 is sleeved on the bolt, and the nut 20 and the bolt 19 are tightened to each other to fix the pressure plate 21 on the top surface of the upper valve cover 1. The filler gland 4 applies pressure through the pressure plate 21 to keep the filler component 3 tight in the accommodation cavity.

In some embodiments, the upper guide ring 23 is arranged in the inner ring of the filler gland 4, which is against the valve stem 2. The lower guide sleeve 24 is arranged in the upper gland 1, which is against the valve stem 2.

In some embodiments of the present disclosure, the problems of valve stem crawling, high-temperature clamping, offset and medium leakage at the filler can be effectively solved during the operation of the straight-stroke regulating valve stem under the high temperature and normal pressure conditions, making the sealing filler of the straight-stroke regulating valve reach a service life of 100,000 times under the high temperature and normal pressure conditions and the filler leakage less than 50 ppm.

In some embodiments, the structure may further include a drive load detection unit; the drive load detection unit is used to obtain a drive load when the valve stem is driven. The drive load detection unit includes a microprocessor and an early warning unit. The microprocessor is used to control the early warning unit to issue an early warning in response to an actual drive load at a current moment not meeting a preset condition.

The drive load detection unit is a device used to monitor the drive load of the valve stem during the transmission process. The drive load detection unit may obtain the drive load of the valve stem in real time when the valve is opened or closed.

The microprocessor and the early warning unit may be in various forms. In some embodiments, the microprocessor may include, but is not limited to, a microcontroller, an embedded processor, or an application-specific integrated circuit (ASIC), etc. The early warning unit may include, but is not limited to, an LED indicator, a speaker, a vibration motor, and other early warning devices.

In some embodiments, the preset condition may be that the actual drive load at the current moment is within a preset range. The preset range includes a preset upper limit and a preset lower limit.

In some embodiments, the preset condition relates to a target filler parameter, a valve stem parameter, a sealed medium parameter, and a drive load corresponding to the target filler parameter. Preferably, the preset upper and preset lower limits may be determined based on the target filler parameter, the valve stem parameter, the sealed medium parameter, and the drive load corresponding to the target filler parameter.

The filler parameter is a parameter that represents a physical property and a geometry property of the filler. In some embodiments, the filler parameter may include at least a filler physical parameter and a filler geometry parameter. The filler physical parameter indicates the physical property of the filler, which may include, for example, but is not limited to, a filler density, a filler material, etc. The filler geometry parameter may indicate the geometry property of the filler, which may include, for example, but is not limited to, a filler angle, a gap thickness, etc. The filler angle may be an acute angle of the right triangle corresponding to the upper filler and the lower filler, and the gap thickness may be a width of the wedge-shaped metal ring. The target filler parameter is a filler parameter that can maintain a good sealing performance of the filler sealing structure and reduce the drive load under meeting working conditions. For more information about the target filler parameter, please refer to the description below.

The valve stem parameter is a parameter that represents a physical property of the valve stem. The valve stem parameter may include, but is not limited to, a valve stem material, a valve stem shaft radius, a valve stem length, etc.

The sealed medium parameter is a parameter that represents a property of the sealed medium. The sealed medium parameter may include, but is not limited to, a type of medium (e.g., nitrogen, chlorine, etc.), a morphological feature of the medium (e.g., solid, liquid, gaseous), etc.

In some embodiments, the microprocessor may construct a parameter feature vector based on the target filler parameter, the valve stem parameter, the sealed medium parameter, and the drive load corresponding to the target filler parameter, and determine the preset upper limit and the preset lower limit through a vector database.

The vector database is a database for storing, indexing, and querying vectors. Similarity queries and other vector management may be performed quickly for a large number of vectors through the vector database.

In some embodiments, the vector database may contain multiple reference feature vectors, each reference feature vector corresponding to a reference preset upper limit and a reference preset lower limit. The vector database may be constructed in advance based on parameter data from historical usage data of the straight-stroke no-material-loss high-temperature normal-pressure filler sealing structure.

In some embodiments, the microprocessor may conduct a search in the vector database based on the parameter feature vector, return a reference feature vector that meets a preset matching condition as a matching feature vector, and determine the reference preset upper limit and the reference preset lower limit corresponding to the matching vector as the preset upper limit and the preset lower limit, respectively. The preset matching condition may refer to a judgment condition for determining the matching feature vector. In some embodiments, the preset matching condition may include a vector distance less than a distance threshold, a vector distance being minimum, etc.

In some embodiments, the preset condition may include a difference between the actual drive load at the current moment and a standard drive load at the current moment being less than a preset threshold.

The standard drive load may be a drive load of the valve stem in ideal operating condition. The ideal operating condition refers to the normal operation of the straight-stroke no-material-loss high-temperature normal-pressure filler sealing structure during the service time without accidental damage (e.g., vandalism, extreme bad condition damage, etc.).

The standard drive load at the current moment may be obtained in a variety of ways. In some embodiments, the drive load detection unit may also have a built-in wireless communication unit, and the wireless communication unit is used to communicate with a remote server, etc. The standard drive load at the current moment may be obtained from the remote server, etc. through networking.

In some embodiments, the standard drive load at the current moment may be determined by the microprocessor based on a decay feature of the drive load. In some embodiments, the microprocessor may calculate the drive load at the current moment based on the decay feature of the drive load based on a time of use corresponding to the current moment and determine the drive load as the standard drive load at the current moment. The time of use corresponding to the current moment is a time period from a factory time to the current moment. The decay feature may be expressed as a change law of the drive load applied on the valve stem over time during operation. For example, the decay feature may include decay rate of the valve stem corresponding to different time intervals of use. The decay feature may be obtained based on a priori knowledge or historical data.

The preset threshold is a predefined value, which is used to indicate a permissible range of the difference between the actual drive load and the standard drive load at the same moment, and the preset threshold may be determined based on manual experience.

In some embodiments, the microprocessor may determine whether the actual drive load at the current moment is within the preset range. When the actual drive load is not within the preset range, it is judged that the actual drive load at the current moment does not meet the preset condition, and the microprocessor controls the early warning unit to issue an early warning.

It should be noted that when the drive load on the valve stem is less than the preset lower limit, the valve stem cannot open or close the valve; when the drive load on the valve stem is greater than the preset upper limit, it may cause damage to the valve stem. By detecting whether the actual drive load is within the preset range in real time, when it is not within the preset range, the warning can be given in time to ensure the service life and safety of the filler sealing structure.

In some embodiments, the microprocessor may determine whether the difference between the actual drive load at the current moment and the standard drive load at the current moment is less than the preset threshold. When the difference is greater than the preset threshold, it is judged that the actual drive load at the current moment does not meet the preset condition, and the microprocessor controls the early warning unit to issue an early warning.

In some embodiments of the present disclosure, the difference between the actual drive load and the standard drive load is monitored in real time and the preset condition is set. When the filler sealing structure becomes abnormal, the early warning unit issues a warning in time, thus reducing the risk of failure and improving the service life and safety of the filler sealing structure.

In some embodiments, the microprocessor is further used to control the early warning unit to issue an early warning in response to the actual drive load not meeting the preset condition for at least a preset number of consecutive moments.

In some embodiments, the preset number may be determined at least based on the filler geometry parameter. For example, the larger the gap thickness in the filler geometry parameter is, the larger the preset number may be set.

In some embodiments of the present disclosure, the reliability of the early warning signal can be ensured by setting a continuous preset number to avoid false alarms caused by a single abnormal drive load time point. The influence of the filler geometry parameter on the valve stem can be fully considered by setting the preset number related to the filler geometry parameter. The greater the gap thickness is, the richer the diversity of the filler deformations occurring is (the longer the distance traveled by the upper and lower filler is when fitting up and down), therefore the correspondingly greater the dispersion of the drive load may be (i.e., there may be a wide variety of drive loads due to the greater diversity and uncertainty of deformations), so the preset number is larger, the fewer false alarms can be minimized.

The embodiment of the present disclosure also discloses a method for installing a straight-stroke no-material-loss high-temperature normal-pressure filler sealing structure. The method for installing includes: determining a target filler parameter and symmetrically setting the first primary-secondary filler and the second primary-secondary filler based on the target filler parameter. In some embodiments, the method may be performed by a remote server, etc.

The target filler parameter may be determined in a variety of ways. In some embodiments, the target filler parameter may be determined artificially based on historical experience. For more information about the target filler parameter, please refer to the above descriptions.

In some embodiments, a manner for determining the target filler parameter includes: generating at least one group of candidate filler parameters; for each group of at least one group of candidate filler parameters, determining a predicted leakage rate of the group of candidate filler parameters by a leakage rate evaluation model, the leakage rate evaluation model being a machine learning model; and determining the target filler parameter based on the predicted leakage rate of each group of at least one group of the candidate filler parameters.

The candidate filler parameters may be filler parameters that are candidates. For example, in a condition with high humidity, the candidate filler parameters may be filler parameters of a valve stem with a material of 316 stainless steel, a valve stem shaft radius of 35 mm, and a valve stem length of 100 mm, which are used to determine the target filler parameter that maintains good sealing performance of the filler sealing structure and reduces the drive load under meeting the condition. In some embodiments, the candidate filler parameters may be determined based on historical experience.

The predicted leakage rate is an estimated leakage rate of the straight-stroke no-material-loss high-temperature normal-pressure filler sealing structure.

In some embodiments, the leakage rate evaluation model may be a machine learning model. For example, the leakage rate evaluation model may include a recurrent neural network (RNN) model, a neural network (NN) model, a deep neural network (DNN) model, and the like, or any combination thereof.

In some embodiments, an input of the leakage rate evaluation model may include a candidate filler parameter, a valve stem parameter, a sealed medium parameter, etc., and an output of the leakage rate evaluation model may include a predicted leakage rate.

In some embodiments, the leakage rate evaluation model may include a first embedding layer and a first prediction layer; the first embedding layer is used to process a candidate filler parameter, a stem parameter, and a sealed medium parameter to determine a first embedding vector; the first prediction layer is used to process the first embedding vector to determine the predicted leakage rate.

In some embodiments, an output of the first embedding layer may be used as an input of the first prediction layer. In some embodiments, the first embedding layer and the first prediction layer may be obtained by a joint training.

In some embodiments, a first training sample for training the leakage rate evaluation model includes historical filler parameters, historical valve stem parameters, and historical sealed media parameters of a sample straight-stroke non-material-loss high-temperature normal-pressure filler sealing structure, and a first label is the corresponding measured leakage rate. The first training sample and the first label may be obtained by manual collection based on historical usage data of the sample straight-stroke non-material-loss high-temperature normal-pressure filler sealing structure.

The exemplary joint training process includes: inputting the first training sample into an initial first embedding layer to obtain the first embedding vector output by the initial first embedding layer; inputting the first embedding vector into the initial first prediction layer to obtain the predicted leakage rate output by the initial first prediction layer; constructing a loss function based on the first label and the predicted leakage rate output by the initial first prediction layer, and simultaneously updating parameters of the initial first embedding layer and the initial first prediction layer. The trained first embedding layer and the trained first prediction layer are obtained through parameter updating, i.e., the trained leakage rate evaluation model is obtained.

In some embodiments, the target filler parameter may be determined in a variety of ways based on the predicted leakage rate corresponding to each group of candidate filler parameters. For example, the candidate filler parameter corresponding to the smallest of the multiple predicted leakage rates may be determined as the target filler parameter.

In some embodiments, a candidate filler parameter with the predicted leakage rate less than a leakage rate threshold may be determined as an optional filler parameter. For at least one group of the obtained optional filler parameters, a mechanical evaluation value of each group of at least one group of optional filler parameters may be determined by a mechanical evaluation value determination model, and the target filler parameter may be determined based on the mechanical evaluation value of each group of at least one group of optional filler parameters.

The optional filler parameter is a candidate filler parameter with the predicted leakage rate less than the leakage rate threshold.

The mechanical evaluation value may be used to evaluate the sealing performance of the valve under specific operating conditions. In some embodiments, the mechanical evaluation value includes at least a gland load, a drive load, and a pressure measurement factor. The pressure measurement factor is a ratio of a radial load to an axial load.

In some embodiments, the mechanical evaluation value also includes a decay feature of the drive load. For more information about the decay feature, please refer to the above descriptions.

In some embodiments, the mechanical evaluation value determination model may be a machine learning model. For example, the mechanical evaluation value determination model may include a recurrent neural network (RNN) model, a neural network (NN) model, a deep neural network (DNN) model, or any combination thereof.

In some embodiments, an input of the mechanical evaluation value determination model may include an optional filler parameter, a valve stem parameter, a sealed medium parameter, etc., and an output of the mechanical evaluation value determination model may include a mechanical evaluation value, etc.

In some embodiments, the mechanical evaluation value determination model includes a second embedding layer and a second prediction layer; the second embedding layer is used to process an optional filler parameter, a valve stem parameter and a sealed medium parameter to determine a second embedding vector; and the second prediction layer is used to process the second embedding vector to determine the mechanical evaluation value.

In some embodiments, the first embedding layer and the second embedding layer may be the same model.

In some embodiments, an output of the second embedding layer may be used as an input of the second prediction layer. In some embodiments, the second embedding layer and the second prediction layer may be obtained by a joint training.

In some embodiments, a second training sample of the mechanical evaluation value determination model includes historical filler parameters, historical valve stem parameters, and historical sealed media parameters of a sample straight-stroke no-material-loss high-temperature normal-pressure filler sealing structure, and a second label is a corresponding measured mechanical evaluation value. The second training sample and the second label may be obtained manually based on historical usage data of the sample straight-stroke non-material-loss high-temperature normal-pressure filler sealing structure.

The exemplary joint training process includes: inputting the second training sample into an initial second embedding layer to obtain the second embedding vector output by the initial second embedding layer, and inputting the second embedding vector into an initial second prediction layer to obtain the mechanical evaluation value output by the initial second prediction layer. A loss function is constructed based on the second label and the mechanical evaluation value output by the initial second prediction layer, and parameters of the initial second embedding layer and the initial second prediction layer are updated simultaneously. The trained second embedding layer and the trained second prediction layer are obtained by parameter updating, i.e., the trained mechanical evaluation value determination model is obtained.

In some embodiments, the target filler parameter may be determined by a preset rule based on the mechanical evaluation values of each group of at least one group of optional filler parameters. In some embodiments, the preset rule may be that an optional filler parameter with a lower gland load, a lower drive load, and a higher pressure measurement factor is determined as the target filler parameter.

In some embodiments of the present disclosure, the target filler parameter may be determined accurately by determining the leakage rate evaluation model, the mechanical evaluation value determination model, effectively improving the sealing performance of the filler sealing structure and reducing the risk of medium leakage at the filler. By determining the target filler parameter, it can make the straight-stroke no-material-loss high-temperature normal-pressure filler sealing structure maintain good sealing performance, avoid the problem of medium leakage at the filler caused by insufficient filler sealing force, and reduce the driving force required for the valve stem, thus extending its service life.

The basic concepts have been described above, apparently, in detail, as will be described above, and does not constitute limitations of the disclosure. Although there is no clear explanation here, those skilled in the art may make various modifications, improvements, and modifications of present disclosure. This type of modification, improvement, and corrections are recommended in present disclosure, so the modification, improvement, and the amendment remain in the spirit and scope of the exemplary embodiment of the present disclosure.

At the same time, present disclosure uses specific words to describe the embodiments of the present disclosure. As "one embodiment", "an embodiment", and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of present disclosure are not necessarily all referring to the same embodiment. Further, certain features, structures, or features of one or more embodiments of the present disclosure may be combined.

Moreover, unless the claims are clearly stated, the sequence of the present disclosure, the use of the digital letters, or the use of other names is not configured to define the order of the present disclosure processes and methods. Although some examples of the disclosure currently considered useful in the present disclosure are discussed in the above disclosure, it should be understood that the details will only be described, and the appended claims are not limited to the disclosure embodiments. The requirements are designed to cover all modifications and equivalents combined with the substance and range of the present disclosure. For example, although the implementation of various components described above may be embodied in a hardware device, it may also be implemented as a software only scheme, e.g., an installation on an existing server or mobile device.

Similarly, it should be noted that in order to simplify the expression disclosed in the present disclosure and help the understanding of one or more embodiments, in the previous description of the embodiments of the present disclosure, a variety of features are sometimes combined into one embodiment, drawings or description thereof. However, this disclosure method does not mean that the characteristics required by the object of the present disclosure are more than the characteristics mentioned in the claims. Rather, claimed subject matter may lie in less than all features of a single foregoing disclosed embodiment.

In some embodiments, numbers expressing quantities of ingredients, properties, and so forth, configured to describe and claim certain embodiments of the application are to be understood as being modified in some instances by the term "about," "approximate," or "substantially". Unless otherwise stated, "about", "approximately" or "substantially" indicates that the number is allowed to vary by ±20%. Accordingly, in some embodiments, the numerical parameters used in the specification and claims are approximate values, and the approximate values may be changed according to characteristics required by individual embodiments. In some embodiments, the numerical parameters should be construed in light of the number of reported significant digits and by applying ordinary rounding techniques. Although the numerical domains and parameters used in the present disclosure are configured to confirm its range breadth, in the specific embodiment, the settings of such values are as accurately as possible within the feasible range.

For each patent, patent application, patent application publication and other materials referenced by the present disclosure, such as articles, books, instructions, publications, documentation, etc., hereby incorporated herein by reference. Except for the application history documents that are inconsistent with or conflict with the contents of the present disclosure, and the documents that limit the widest range of claims in the present disclosure (currently or later attached to the present disclosure). It should be noted that if a description, definition, and/or terms in the subsequent material of the present disclosure are inconsistent or conflicted with the content described in the present disclosure, the use of description, definition, and/or terms in this manual shall prevail.

Finally, it should be understood that the embodiments described herein are only configured to illustrate the principles of the embodiments of the present disclosure. Other deformations may also belong to the scope of the present disclosure. Thus, as an example, not limited, the alternative configuration of the present disclosure embodiment may be consistent with the teachings of the present disclosure. Accordingly, the embodiments of the present disclosure are not limited to the embodiments of the present disclosure clearly described and described.

What is claimed is:

1. A straight-stroke no-material-loss high-temperature normal-pressure filler sealing structure, comprising:
    an upper valve cover with an accommodation cavity;
    a valve stem, passing through the accommodation cavity of the upper valve cover;
    a filler component, located in the accommodation cavity and sleeved on the valve stem; and
    a filler gland sleeved on the valve stem, whose bottom is inserted into an opening of the accommodation cavity; wherein
    the filler component includes a first scraper ring, a first primary-secondary filler, a support ring, a second primary-secondary filler, and a second scraper ring which are sleeved on the valve stem in succession, and the first scraper ring and the second scraper ring are arranged symmetrically;
    the first scraper ring includes metal scrapers in an up-down arrangement, and a graphite sealing ring located between the metal scrapers; a bottom of an inner ring of the metal scraper located below is provided with an arc angle, and an annular storage groove is arranged upward at the bottom of the inner ring of the metal scraper.

2. The structure of claim 1, wherein the first primary-secondary filler and the second primary-secondary filler are arranged symmetrically;
    the first primary-secondary filler includes an upper filler having an inverted right triangle cross-section, and a lower filler having an upright right triangle cross-section; the lower filler is sleeved inside the upper filler, and the upper filler and the lower filler are connected by a wedge-shaped metal ring.

3. The structure of claim 1, wherein a filler bottom gasket and a heat insulation ring are also arranged below the filler component in succession.

4. The structure of claim 1, wherein a top of the upper valve cover is fixed with a pressure plate by a bolt and a nut, and the pressure plate is pressed against an upper end surface of the filler gland; and a pretension disc is sleeved on the bolt and located between the pressure plate and the nut.

5. The structure of claim 1, wherein an inner ring of the filler gland is provided with an upper guide ring against the valve stem; and a lower guide sleeve against the valve stem is provided inside the upper valve cover.

\* \* \* \* \*